United States Patent
Zhang et al.

(10) Patent No.: US 12,445,647 B2
(45) Date of Patent: Oct. 14, 2025

(54) METHOD AND APPARATUS FOR ENCODING/DECODING POINT CLOUD COORDINATE TRANSFORMATION RESIDUAL

(71) Applicant: Honor Device Co., Ltd., Shenzhen (CN)

(72) Inventors: Wei Zhang, Shenzhen (CN); Fuzheng Yang, Shenzhen (CN); Tian Chen, Shenzhen (CN); Wenjie Zou, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 3 days.

(21) Appl. No.: 18/265,850

(22) PCT Filed: May 18, 2022

(86) PCT No.: PCT/CN2022/093677
§ 371 (c)(1),
(2) Date: Jun. 7, 2023

(87) PCT Pub. No.: WO2022/247715
PCT Pub. Date: Dec. 1, 2022

(65) Prior Publication Data
US 2025/0080772 A1  Mar. 6, 2025

(30) Foreign Application Priority Data
May 26, 2021 (CN) .......................... 202110580212.1

(51) Int. Cl.
*H04N 19/60* (2014.01)
(52) U.S. Cl.
CPC .................................. *H04N 19/60* (2014.11)
(58) Field of Classification Search
CPC ...................................................... H04N 19/60
See application file for complete search history.

(56) References Cited

U.S. PATENT DOCUMENTS

| 11,398,042 B2 | 7/2022 | Zhao |
| 2019/0311500 A1 | 10/2019 | Mammou et al. |

(Continued)

FOREIGN PATENT DOCUMENTS

| CN | 108876926 A | 11/2018 |
| CN | 111145090 A | 5/2020 |

(Continued)

OTHER PUBLICATIONS

WG7, MPEG 3D Graphics Coding, "G-PCC codec description", 133. MPEG Meeting, Jan. 11, 2021-Jan. 15, 2021, Online, (Motion Picture Expert Group or ISO/IEC JTC1/SC29/WG11), No. n20028, Apr. 22, 2021 (Apr. 22, 2021), 150 pages.

(Continued)

*Primary Examiner* — Nasim N Nirjhar
(74) *Attorney, Agent, or Firm* — Slater Matsil, LLP

(57) ABSTRACT

An encoding method includes: obtaining original point cloud data; transforming coordinates of the original point cloud data to obtain a coordinate transformation residual; establishing a relationship between azimuth information of a point cloud and the coordinate transformation residual; determining an encoding rule for the coordinate transformation residual based on the relationship between the azimuth information of the point cloud and the coordinate transformation residual; and encoding the coordinate transformation residual according to the encoding rule, to obtain data rate information.

20 Claims, 5 Drawing Sheets

(56) References Cited

U.S. PATENT DOCUMENTS

| | | |
|---|---|---|
| 2020/0137399 A1 | 4/2020 | Li et al. |
| 2021/0049828 A1 | 2/2021 | Park et al. |
| 2022/0358686 A1 | 11/2022 | Lasserre et al. |
| 2022/0398784 A1 | 12/2022 | Taquet et al. |
| 2023/0196625 A1 | 6/2023 | Li et al. |
| 2023/0267651 A1 | 8/2023 | Zhang et al. |
| 2023/0328285 A1* | 10/2023 | Oh .................. H04N 19/70 375/240.02 |
| 2024/0029311 A1* | 1/2024 | Park .................. G06T 9/001 |
| 2024/0163451 A1* | 5/2024 | Gao .................. H04N 19/184 |

FOREIGN PATENT DOCUMENTS

| | | |
|---|---|---|
| CN | 111699683 A | 9/2020 |
| CN | 112385236 A | 2/2021 |
| CN | 112565734 A | 3/2021 |
| WO | 2020248187 A1 | 12/2020 |
| WO | 2021022621 A1 | 2/2021 |
| WO | 2021084292 A1 | 5/2021 |
| WO | 2021084295 A1 | 5/2021 |

OTHER PUBLICATIONS

Jonathan Taquet (Xiaomi) et al: "[G-PCC][New] Improved Quantization of Azimuthal Angle in Predictive Geometry Coding", 133. MPEG Meeting, Jan. 11, 2021-Jan. 15, 2021, Online, (Motion Picture Expert Group or ISO/IEC JTC1/SC29/WG11), No. m55979, Jan. 6, 2021 (Jan. 6, 2021), 10 pages.

Geert Van Der Auwera (Qualcomm) et al: "[GPCC][New] Planar and azimuthal coding mode simplifications", 131. MPEG Meeting, Jun. 29, 2020-Jul. 3, 2020, Online, (Motion Picture Expert Group or ISO/IEC JTC1/SC29/WG11), No. m54694, Jul. 1, 2020 (Jul. 1, 2020), 8 pages.

Sun, Xuebin et al., "A Novel Coding Architecture for LiDAR Point Cloud Sequence," IEEE Robotics and Automation Letters, Oct. 2020, 8 pages, vol. 5, No. 4.

\* cited by examiner

METHOD AND APPARATUS FOR ENCODING/DECODING POINT CLOUD COORDINATE TRANSFORMATION RESIDUAL

CROSS-REFERENCE TO RELATED APPLICATIONS

This application is a national stage of International Application No. PCT/CN2022/093677, filed on May 18, 2022, which claims priority to Chinese Patent Application No. 202110580212.1, filed on May 26, 2021, both of which are incorporated herein by references in their entireties.

TECHNICAL FIELD

The present invention pertains to the field of point cloud encoding/decoding technologies, and particularly relates to a method and an apparatus for encoding/decoding a point cloud coordinate transformation residual

BACKGROUND

With the improvement of a hardware processing capability and the rapid development of computer vision, three-dimensional point cloud data has been widely used in fields such as virtual reality, augmented reality, self-driving, and environment modeling. However, a large-scale point cloud usually has a large amount of data, which is not conducive to the transmission and storage of the point cloud data. Therefore, the large-scale point cloud needs to be efficiently encoded/decoded.

In an existing point cloud encoding/decoding technology, to improve encoding efficiency of a point cloud, an original point cloud usually needs to be transformed from one coordinate system to another coordinate system, and then inversely transformed to obtain new coordinates. Due to a precision loss, the coordinates are not entirely consistent with original point cloud coordinates, and a residual between the coordinates is referred to as a coordinate transformation residual. For example, in a point cloud encoding/decoding method based on a prediction tree and a point cloud encoding/decoding method based on a single-chain structure that are provided in the prior art, a point cloud needs to be transformed from original Cartesian coordinates to cylindrical coordinates (including depth information, pitch angle information, and azimuth information), and then the cylindrical coordinates of the point cloud are reversely transformed into the Cartesian coordinates to obtain a coordinate transformation residual of the point cloud, and finally, the coordinate transformation residual of the point cloud is encoded.

However, when the foregoing two methods are used to encode the coordinate transformation residual of the point cloud, a traversal method is used to traverse three residual components and perform entropy encoding one by one. In other words, existing coordinate transformation residual encoding uses only information about a coordinate transformation residual component to establish an entropy encoding context model, and a relationship between other information and a coordinate transformation residual is not taken into consideration. Consequently, a context model established through entropy encoding is not accurate and effective enough, and therefore, encoding efficiency is not high.

SUMMARY

To resolve the foregoing problem in the prior art, the present invention provides a method and an apparatus for encoding/decoding a point cloud coordinate transformation residual. Technical problems in the present invention are resolved by the following technical solutions:

A method for encoding a point cloud coordinate transformation residual includes:
  obtaining original point cloud data;
  transforming coordinates of the original point cloud data to obtain a coordinate transformation residual;
  establishing a relationship between azimuth information of a point cloud and the coordinate transformation residual;
  determining an encoding rule for the coordinate transformation residual based on the relationship between the azimuth information of the point cloud and the coordinate transformation residual; and
  encoding the coordinate transformation residual according to the encoding rule, to obtain data rate information.

In an embodiment of the present invention, the establishing a relationship between azimuth information of a point cloud and the coordinate transformation residual includes:
  establishing function expressions between the azimuth information of the point cloud and the coordinate transformation residual as follows:

$$\Delta x = r \cdot \cos(\varphi) - (r + \Delta r) \cdot \cos(\varphi + \Delta \varphi), \text{ and}$$

$$\Delta y = r \cdot \sin(\varphi) - (r + \Delta r) \cdot \sin(\varphi + \Delta \varphi).$$

$\Delta x$ and $\Delta y$ represent coordinate transformation residual components of a point, r represents depth information of the point, $\varphi$ represents azimuth information of the point, $\Delta r$ represents a precision loss of the depth information of the point, and $\Delta \varphi$ represents a precision loss of the azimuth information of the point.

In an embodiment of the present invention, the function expressions between the azimuth information of the point cloud and the coordinate transformation residual may be further approximated as follows:

$$\Delta x \approx -\Delta r \cdot \cos(\varphi), \text{ and}$$

$$\Delta y \approx -\Delta r \cdot \sin(\varphi).$$

$\Delta x$ and $\Delta y$ represent coordinate transformation residual components of a point, $\varphi$ represents azimuth information of the point, and $\Delta r$ represents a precision loss of depth information of the point.

In an embodiment of the present invention, the establishing a relationship between azimuth information of a point cloud and the coordinate transformation residual further includes:
  obtaining a specific representation form of an angle value of an azimuth, a function value of an azimuth, or an azimuth symbol based on a function expression or an approximate expression of the azimuth information of the point cloud and the coordinate transformation residual.

In an embodiment of the present invention, the determining an encoding rule for the coordinate transformation residual based on the relationship between the azimuth information of the point cloud and the coordinate transformation residual includes:

dividing the azimuth into several intervals based on the relationship between the azimuth information of the point cloud and the coordinate transformation residual; and setting a corresponding encoding rule for the coordinate transformation residual for each azimuth interval.

In an embodiment of the present invention, the setting a corresponding encoding rule for the coordinate transformation residual for each azimuth interval includes:

separately assigning a context model for a coordinate transformation residual of each azimuth interval, and performing corresponding initialization for entropy encoding of the coordinate transformation residual.

In an embodiment of the present invention, the encoding the coordinate transformation residual according to the encoding rule includes:

obtaining azimuth information of a current point, and determining an azimuth interval to which the current point belongs; and for different coordinate transformation residual components of the current point, selecting a corresponding context model based on the azimuth interval to perform entropy encoding.

Another embodiment of the present invention provides an apparatus for encoding a point cloud coordinate transformation residual, including:

a data obtaining module, configured to obtain original point cloud data;

a coordinate transformation module, configured to transform coordinates of the original point cloud data to obtain a coordinate transformation residual;

a calculating module, configured to establish a relationship between azimuth information of a point cloud and the coordinate transformation residual;

a rule determining module, configured to determine an encoding rule for the coordinate transformation residual based on the relationship between the azimuth information of the point cloud and the coordinate transformation residual; and an encoding module, configured to encode the coordinate transformation residual according to the encoding rule, to obtain data rate information.

Still another embodiment of the present invention further provides a method for decoding a point cloud coordinate transformation residual, including:

obtaining data rate information;

determining a decoding rule for a coordinate transformation residual based on a relationship between azimuth information of a point cloud and the coordinate transformation residual; and decoding the data rate information according to the decoding rule, to obtain a reconstructed point cloud coordinate transformation residual.

Yet another embodiment of the present invention further provides an apparatus for decoding a point cloud coordinate transformation residual, including:

a second data obtaining module, configured to obtain data rate information;

a second rule determining module, configured to determine a decoding rule for the coordinate transformation residual based on a relationship between azimuth information of a point cloud and the coordinate transformation residual; and a decoding module, configured to decode the data rate information according to the decoding rule, to obtain a reconstructed point cloud coordinate transformation residual.

Beneficial effects of the present invention are as follows:

In the present invention, a relationship between azimuth information of a point cloud and a coordinate transformation residual is established, and an encoding rule is set for the coordinate transformation residual by using the azimuth information of the point cloud. Compared with an existing method for establishing a context model of entropy encoding by using only information about the coordinate transformation residual, a more accurate and effective context model is designed for entropy encoding of the coordinate transformation residual by using a relationship between other information and the coordinate transformation residual, so that encoding efficiency of the point cloud is improved.

The present invention is further described in detail below with reference to the accompanying drawings and embodiments.

DETAILED DESCRIPTION OF ILLUSTRATIVE EMBODIMENTS

The present invention is further described in detail below with reference to specific embodiments, but implementations of the present invention are not limited thereto.

Embodiment 1

Figure 1:
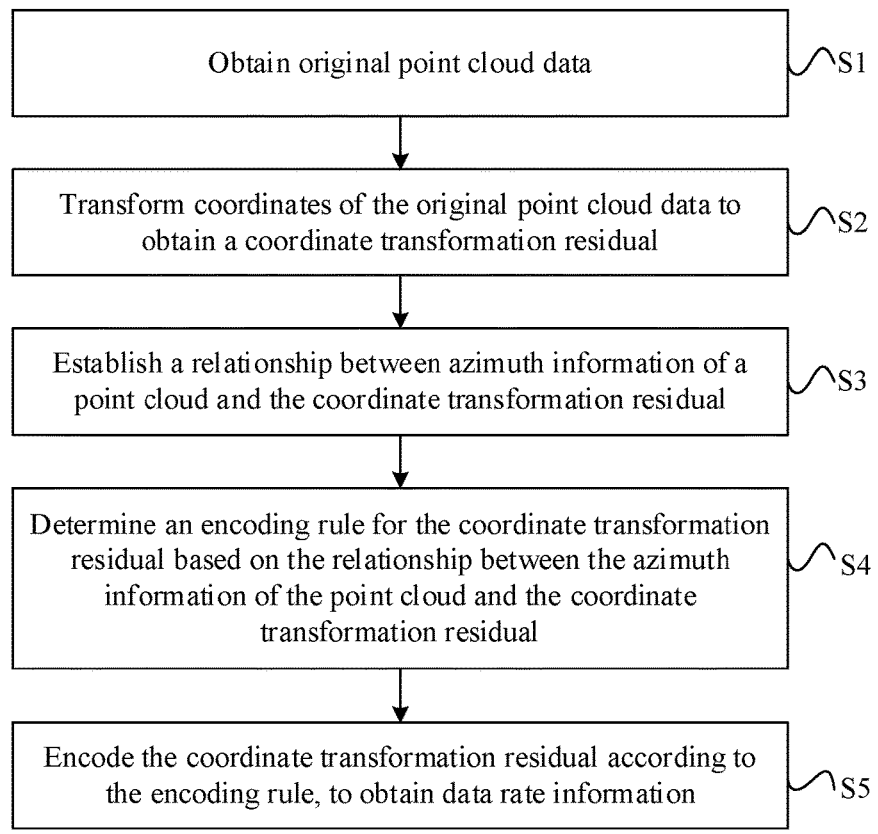
FIG. 1 is a schematic flowchart of a method for encoding a point cloud coordinate transformation residual according to an embodiment of the present invention.

FIG. 1 is a schematic flowchart of a method for encoding a point cloud coordinate transformation residual according to an embodiment of the present invention. The method includes the following steps.

Step 1: Obtain original point cloud data.

Specifically, the original point cloud data generally includes a set of three-dimensional spatial points, each spatial point records geometric position information of the spatial point and additional attribute information such as color, reflectivity, and normal. Generally, geometric position information of a point cloud is expressed based on a Cartesian coordinate system; in other words, coordinates x, y, and z of a point are used for representation. The original point cloud data may be obtained by a laser radar through scanning. The laser radar is formed by a combination of a plurality of lasers (laser scanners) distributed along two sides of a central axis. Each laser has a fixed pitch angle, and may be considered as a relatively independent collection system. In addition, the original point cloud data may also be obtained by using common data sets provided by various platforms.

In this embodiment, the obtained geometric position information of the original point cloud data is represented based on the Cartesian coordinate system. It should be noted that representation of the geometric position information of the original point cloud data is not limited to Cartesian coordinates.

Step 2: Transform coordinates of the original point cloud data to obtain a coordinate transformation residual.

In this embodiment, Cartesian coordinates may be used to represent geometric information of the original point cloud data. Therefore, to facilitate predictive encoding of the geometric information of the point cloud, coordinates of the point cloud need to be transformed, and Cartesian coordinates of the point cloud may be transformed into cylindrical coordinates.

Specifically, the Cartesian coordinates of the point cloud are set to (x,y,z), and corresponding cylindrical coordinates (r,φ,i) are obtained by using the following coordinate transformation formulas:

$$r = \sqrt{x^2 + y^2},$$

$$\varphi = \arctan\frac{y}{x}, \text{ and}$$

$$i = \arg\min_{k=1N}|z + zLaser(k) - r \times \tan(\theta(k))|.$$

r represents depth information of a point, φ represents azimuth information of the point, i represents an ID of a laser to which the point belongs, zLaser(k) is a vertical offset of a $k^{th}$ laser of the laser radar, θ(k) is a vertical pitch angle of the $k^{th}$ laser, and both zLaser(k) and θ(k) are prior parameters of the laser radar.

Because precision of an encoder is limited, cylindrical coordinates stored in the encoder are coordinates $(r_q,\varphi_q,i)$ for which specific precision is lost, and the cylindrical coordinates $(r_q,\varphi_q,i)$ are inversely transformed into Cartesian coordinates (x',y',z') by using the following formulas:

$$x' = r_q \cdot \cos(\varphi_q),$$

$$y' = r_q \cdot \sin(\varphi_q), \text{ and}$$

$$z' = r_q \cdot \tan(\theta(i)) - zLaser(i).$$

$r_q$ represents an approximate value of the depth information r in current encoding precision, and $\varphi_q$ represents an approximate value of the azimuth information φ in the current encoding precision.

It can be learned from the foregoing analysis that the cylindrical coordinates $(r_q,\varphi_q,i)$ obtained after inversely transforming the coordinates $(r_q,\varphi_q,i)$ for which specific precision is lost are not consistent with original Cartesian coordinates (x,y,z) of the point, and a residual between the coordinates $(r_q,\varphi_q,i)$ and the original Cartesian coordinates (x,y,z), that is, a coordinate transformation residual (Δx,Δy,Δz), is:

$$\Delta x = x - x',$$

$$\Delta y = y - y', \text{ and}$$

$$\Delta z = z - z'.$$

Further, the coordinate transformation residual may be written as:

$$\Delta x = r \cdot \cos(\varphi) - r_q \cdot \cos(\varphi_q),$$

$$\Delta y = r \cdot \sin(\varphi) - r_q \cdot \sin(\varphi_q), \text{ and}$$

$$\Delta z = z - (r_q \cdot \tan(\theta(i)) - zLaser(i)).$$

It can be seen from the foregoing equations that components Δx and Δy in the coordinate transformation residual are closely related to magnitude of an azimuth φ.

Step 3: Establish a relationship between azimuth information of a point cloud and the coordinate transformation residual.

First, a function expression between the azimuth information of the point cloud and the coordinate transformation residual may be established based on a mathematical relationship.

Specifically, because (r,φ,i) is cylindrical coordinates of the point cloud, and $(r_q,\varphi_q,i)$ is cylindrical coordinates for which specific precision is lost, $r_q=r+\Delta r$ and $\varphi_q=\varphi+\Delta\varphi$, where Δr represents a precision loss of the depth information, Δφ represents a precision loss of the azimuth information, and both Δr and Δφ approach 0. In this case, the function expression between the azimuth information of the point cloud and the coordinate transformation residual can be obtained by substituting $r_q=r+\Delta r$ and $\varphi_q=\varphi+\Delta\varphi$ into a calculation formula of the coordinate transformation residual.

$$\Delta x = r \cdot \cos(\varphi) - (r + \Delta r) \cdot \cos(\varphi + \Delta\varphi), \text{ and}$$

$$\Delta y = r \cdot \sin(\varphi) - (r + \Delta r) \cdot \sin(\varphi + \Delta\varphi).$$

Further, because Δφ→0, cos(φ+Δφ)→cos(φ) and sin(φ+Δφ)→sin(φ). Therefore, the foregoing function expressions may be approximated as follows:

$$\Delta x \approx -\Delta r \cdot \cos(\varphi), \text{ and}$$

$$\Delta y \approx -\Delta r \cdot \sin(\varphi).$$

Then, a specific representation form of the relationship between the azimuth and the coordinate transformation residual may be obtained based on the function expression or an approximate function expression between the azimuth information of the point cloud and the coordinate transformation residual.

In this embodiment, a specific representation form of an angle value of an azimuth, a function value of an azimuth, or an azimuth symbol may be obtained based on a function expression or an approximate expression of the azimuth information of the point cloud and the coordinate transformation residual.

For example, a relationship between the azimuth information and the coordinate transformation residual obtained by using the angle value of the azimuth is specifically represented as follows:

when $\varphi \to \frac{\pi}{2}$, $\Delta x \to 0$;

when $\varphi \to -\frac{\pi}{2}$, $\Delta x \to 0$;

when $\varphi \to 0$, $\Delta y \to 0$; and when $\varphi \to \pi$, $\Delta y \to 0$.

Figure 2:
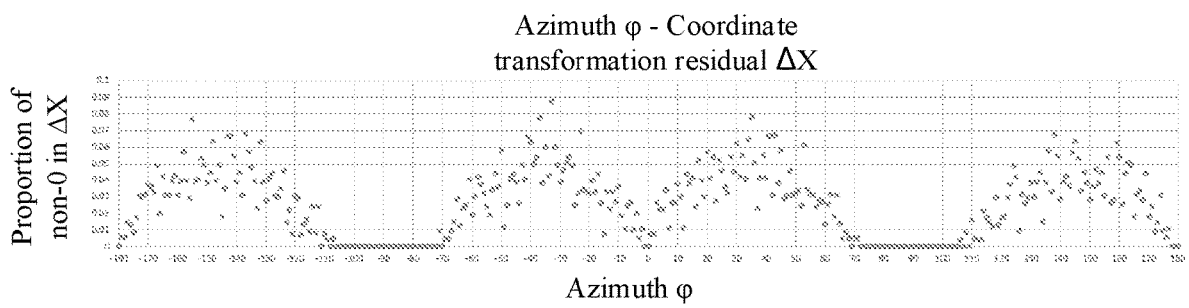
FIG. 2 is a statistical diagram of a relationship between an azimuth (p and a coordinate transformation residual component $\Delta x$ according to an embodiment of the present invention.
Figure 3:
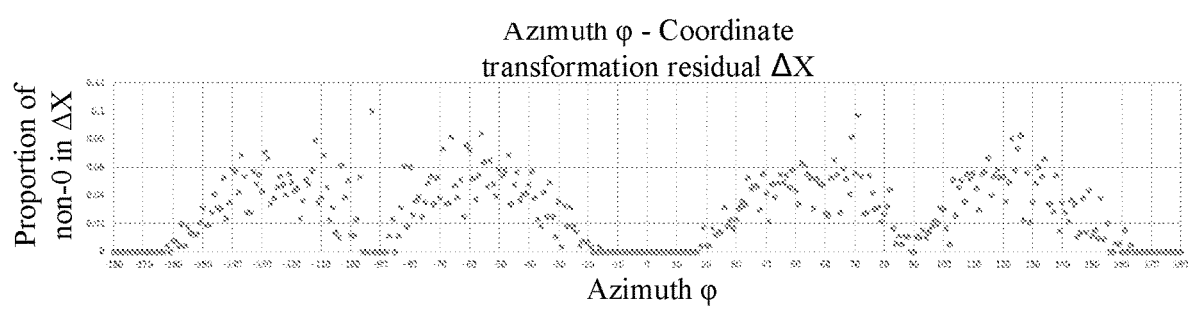
FIG. 3 is a statistical diagram of a relationship between an azimuth φ and a coordinate transformation residual component $\Delta y$ according to an embodiment of the present invention.

Refer to FIG. 2 and FIG. 3. FIG. 2 is a statistical diagram of a relationship between an azimuth φ and a coordinate transformation residual component Δx according to an embodiment of the present invention. FIG. 3 is a statistical diagram of a relationship between an azimuth φ and a coordinate transformation residual component Δy according to an embodiment of the present invention. It can be learned from FIG. 2 and FIG. 3 that there is a close relationship between the azimuth information of the point cloud and the coordinate transformation residual, and different azimuths correspond to different coordinate transformation residual distribution. Therefore, a context model may be designed by using the relationship for entropy encoding of the coordinate transformation residual, so that encoding efficiency of the point cloud is further improved.

Step 4: Determine an encoding rule for the coordinate transformation residual based on the relationship between the azimuth information of the point cloud and the coordinate transformation residual.

Currently, entropy encoding is generally used for encoding point cloud information. Therefore, a corresponding context model needs to be designed to implement entropy encoding. In a conventional entropy encoding process for the coordinate transformation residual, the context model is established by using information about a coordinate transformation residual component.

In this embodiment, after the relationship between the azimuth information of the point cloud and the coordinate transformation residual is established, a corresponding context model may be designed for entropy encoding of the coordinate transformation residual, and may be correspondingly initialized.

First, the azimuth is divided into several intervals based on the relationship between the azimuth information of the point cloud and the coordinate transformation residual.

Specifically, for different coordinate transformation residual components, the azimuth may be divided into a plurality of intervals according to an angle range, for example, the azimuth may be divided into two intervals. For the coordinate transformation residual component Δx, the two intervals may be separately represented as follows:

Interval $x1$: $-90° - T_1 \le \varphi < -90° + T_1$ or $90° - T_1 \le \varphi < 90° + T_1$.

Interval $x2$: Other angle ranges.

For the coordinate transformation residual component Δy, the two intervals may be separately represented as follows:

Interval $y1$: $-180° \le \varphi < -180° + T_2$, $-T_2 \le \varphi < T_2$, or $180° - T_2 \le \varphi < 180°$.

Interval $y2$: Other angle ranges.

$T_1$ and $T_2$ are respectively angle thresholds that are set in the interval x1 and the interval y1, and are positive numbers. Herein, $T_1=20°$ and $T_2=20°$.

In another embodiment of the present invention, the azimuth may be further divided into several intervals according to a function value (such as cos φ, sin φ, or another function value) or an azimuth symbol.

Then, a corresponding encoding rule for the coordinate transformation residual is set for each azimuth interval.

Specifically, because distribution of corresponding coordinate transformation residual components in a same azimuth interval is similar, a context model may be separately assigned to coordinate transformation residual components in each azimuth interval, and a corresponding initialization operation is performed on the context model corresponding to each azimuth interval. For example, for the coordinate transformation residual component Δx, a probability of a symbol 0 in a context model corresponding to the interval x1 may be initialized to 0.9, a probability of a symbol 1 may be initialized to 0.1, and both a probability of a symbol 0 and a probability of a symbol 1 in a context model corresponding to the interval x2 may be initialized to 0.5.

Step 5: Encode the coordinate transformation residual according to the encoding rule, to obtain data rate information.

First, azimuth information of a current point is obtained, and an azimuth interval to which the current point belongs is determined.

Specifically, an azimuth φ of a point (x,y,z) may be calculated by using the following formula:

$$\varphi = \arctan\frac{y}{x}.$$

After the azimuth φ of the current point is obtained, for different coordinate transformation residual components, an azimuth interval to which φ belongs may be determined based on a value of φ. For example, if the azimuth of the current point is φ=75°, for the coordinate transformation residual component Δx of the current point, the azimuth of the point belongs to the interval x1, and for the coordinate transformation residual component Δy, the azimuth of the point belongs to the interval y2.

Then, for different coordinate transformation residual components of the current point, a corresponding context model is selected based on the azimuth interval to perform entropy encoding.

In this embodiment, the azimuth information is related to the component Δx and the component Δy in the coordinate transformation residual. Therefore, in this embodiment, corresponding context models are separately selected based on azimuth intervals to which the two components belong, to perform entropy encoding, and for a component Δz, a conventional entropy encoding method may be used to perform encoding.

Figure 4:
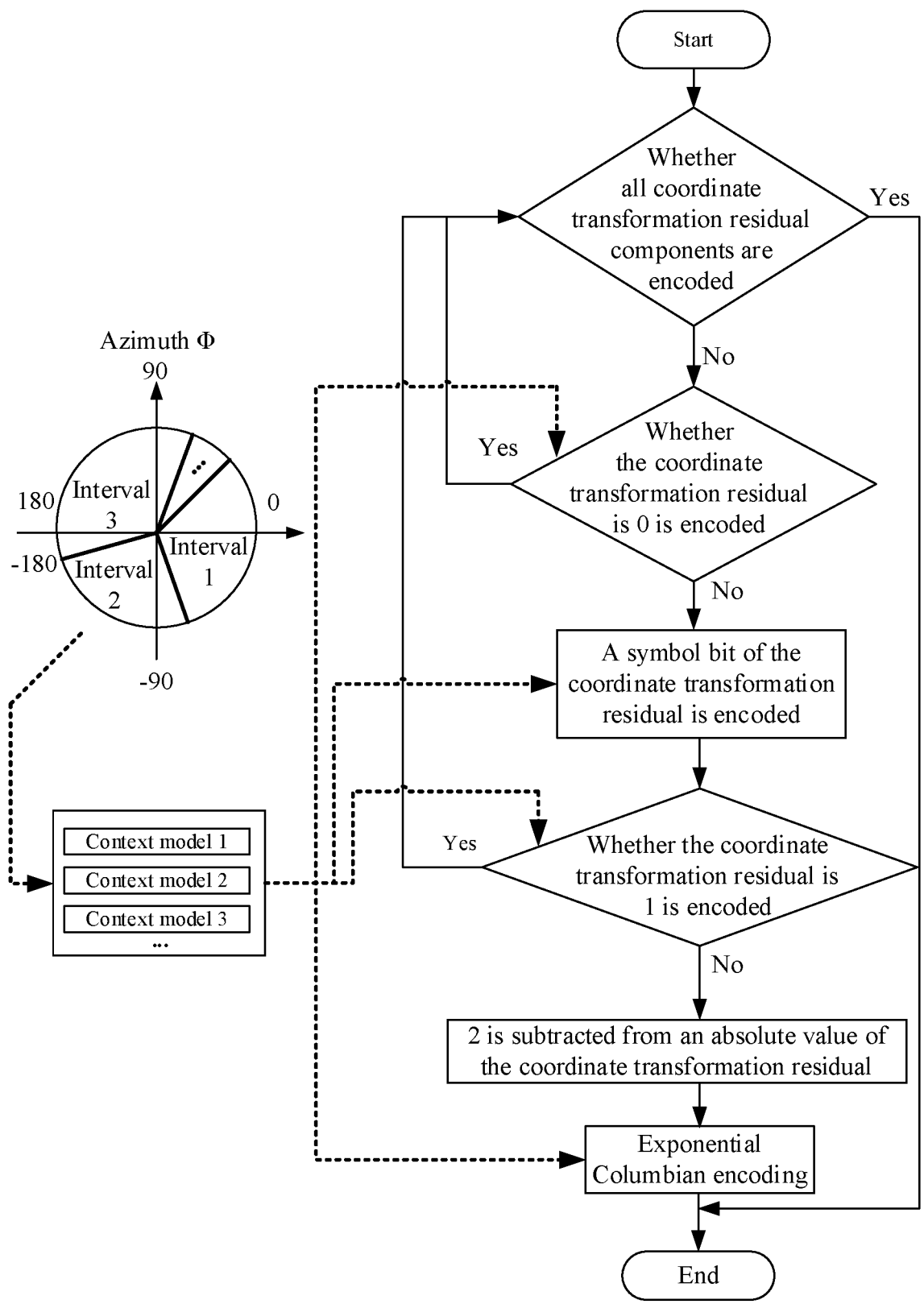
FIG. 4 is a flowchart of entropy encoding of a coordinate transformation residual according to an embodiment of the present invention.

Specifically, FIG. 4 is a flowchart of entropy encoding of a coordinate transformation residual according to an embodiment of the present invention. As shown in FIG. 4, for different coordinate transformation residual components, corresponding context models are separately selected for entropy encoding. During entropy encoding, whether a current residual component is equal to 0 is first encoded. If the current residual component is equal to 0, a next residual component is encoded, or otherwise, a symbol bit of the residual component is encoded, and whether an absolute value of the residual component is equal to 1 is encoded. If the absolute value is equal to 1, a next residual component is encoded, or otherwise, a part that is of an absolute value of the residual component and that is greater than or equal to 2 is encoded by using exponential Columbus.

In the present invention, a relationship between azimuth information of a point cloud and a coordinate transformation residual is established, and an encoding rule is set for the coordinate transformation residual by using the azimuth information of the point cloud. Compared with an existing method for establishing a context model of entropy encoding by using only information about the coordinate transformation residual, a more accurate and effective context model is designed for entropy encoding of the coordinate transformation residual by using a relationship between other information and the coordinate transformation residual, so that encoding efficiency of the point cloud is improved.

Embodiment 2

Figure 5:
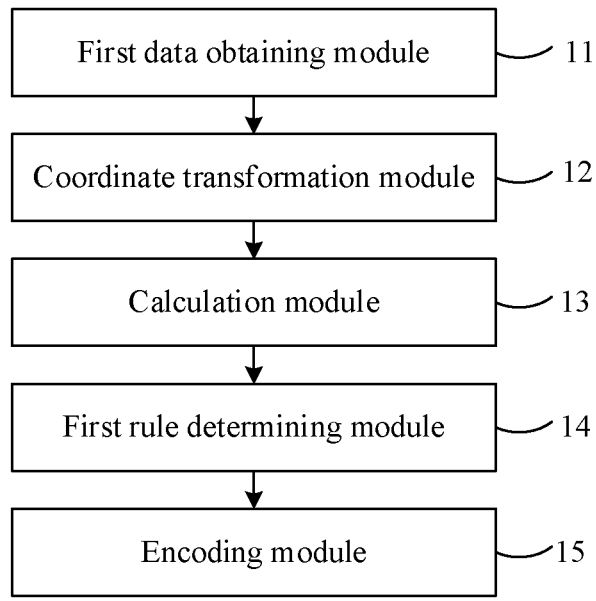
FIG. 5 is a schematic diagram of a structure of an apparatus for encoding a point cloud coordinate transformation residual according to an embodiment of the present invention.

Based on Embodiment 1, this embodiment provides an apparatus for encoding a point cloud coordinate transformation residual. Refer to FIG. 5. FIG. 5 is a schematic diagram of a structure of an apparatus for encoding a point cloud coordinate transformation residual according to an embodiment of the present invention. The apparatus includes:
  a first data obtaining module 11, configured to obtain original point cloud data;
  a coordinate transformation module 12, configured to transform coordinates of the original point cloud data to obtain a coordinate transformation residual;
  a calculating module 13, configured to establish a relationship between azimuth information of a point cloud and the coordinate transformation residual;
  a first rule determining module 14, configured to determine an encoding rule for the coordinate transformation residual based on the relationship between the azimuth information of the point cloud and the coordinate transformation residual; and
  an encoding module 15, configured to encode the coordinate transformation residual according to the encoding rule, to obtain data rate information.

The apparatus provided in this embodiment can implement the method provided in Embodiment 1, and a detailed process is not described herein again.

Embodiment 3

Figure 6:
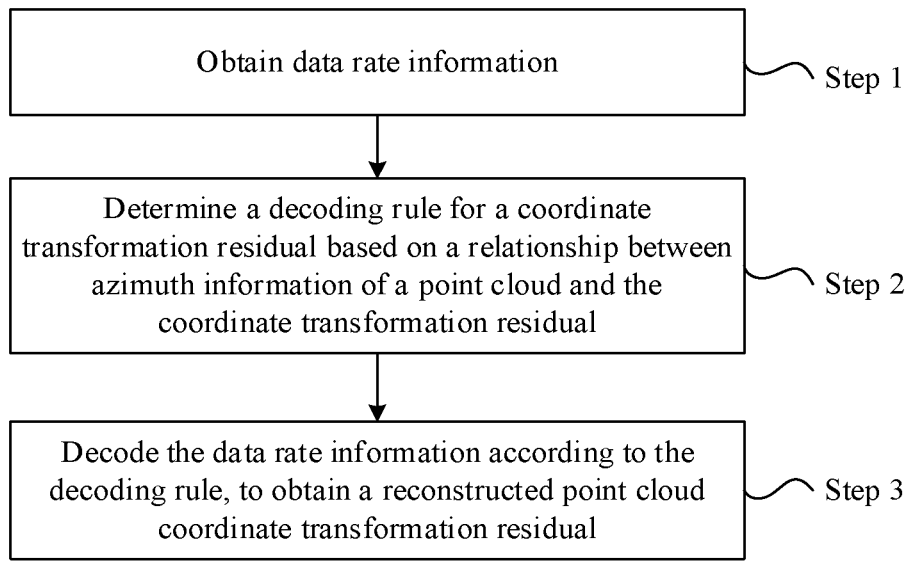
FIG. 6 is a schematic flowchart of a method for decoding a point cloud coordinate transformation residual according to an embodiment of the present invention.

FIG. 6 is a schematic flowchart of a method for decoding a point cloud coordinate transformation residual according to an embodiment of the present invention. The method includes the following steps.

Step 1: Obtain data rate information.

Step 2: Determine a decoding rule for a coordinate transformation residual based on a relationship between azimuth information of a point cloud and the coordinate transformation residual.

Specifically, same as an encoder, an azimuth may be divided into several intervals based on the relationship between the azimuth information of the point cloud and the coordinate transformation residual, and a corresponding decoding rule is set for each interval for different coordinate transformation residual components.

It should be noted that the decoding rule herein corresponds to an encoding rule for a same interval on the encoder. For example, if the encoder assigns an independent entropy encoding context model to each different interval and performs initialization, a decoder also assigns a corresponding entropy decoding context model to the corresponding interval and performs same initialization processing.

Step 3: Decode the data rate information according to the decoding rule, to obtain a reconstructed point cloud coordinate transformation residual.

Specifically, for different coordinate transformation residual components of a to-be-decoded point, an azimuth interval to which the to-be-decoded point belongs may be determined based on reconstructed azimuth information of the point cloud, and a corresponding decoding rule is selected to perform decoding, to obtain a reconstructed coordinate transformation residual.

Embodiment 4

Figure 7:
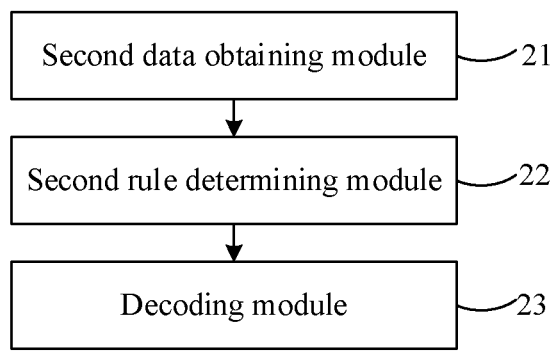
FIG. 7 is a schematic diagram of a structure of an apparatus for decoding a point cloud coordinate transformation residual according to an embodiment of the present invention.

Based on Embodiment 3, this embodiment provides an apparatus for decoding a point cloud coordinate transformation residual. Refer to FIG. 7. FIG. 7 is a schematic diagram of a structure of an apparatus for decoding a point cloud coordinate transformation residual according to an embodiment of the present invention. The apparatus includes:
  a second data obtaining module 21, configured to obtain data rate information;
  a second rule determining module 22, configured to determine a decoding rule for the coordinate transformation residual based on a relationship between azimuth information of a point cloud and the coordinate transformation residual; and
  a decoding module 23, configured to decode the data rate information according to the decoding rule, to obtain a reconstructed point cloud coordinate transformation residual.

The apparatus provided in this embodiment can implement the decoding method provided in Embodiment 3, and a detailed process is not described herein again.

The foregoing content is further detailed descriptions of the present invention with reference to specific preferred implementations, and it cannot be assumed that specific implementation of the present invention is limited to these descriptions. For a person of ordinary skill in the art to which the present invention belongs, several simple deductions or substitutions may be made without departing from the inventive concept, which shall be regarded as falling within the protection scope of the present invention.

What is claimed is:

1. A method for encoding a point cloud coordinate transformation residual, comprising:
  obtaining original point cloud data;
  transforming coordinates of the original point cloud data to obtain a coordinate transformation residual;
  establishing a relationship between azimuth information of a point cloud and the coordinate transformation residual, wherein establishing the relationship between the azimuth information of the point cloud and the coordinate transformation residual comprises:
    establishing function expressions between the azimuth information of the point cloud and the coordinate transformation residual as follows:

$$\Delta x = r \cdot \cos(\varphi) - (r + \Delta r) \cdot \cos(\varphi + \Delta\varphi), \text{ and}$$

$$\Delta y = r \cdot \sin(\varphi) - (r + \Delta r) \cdot \sin(\varphi + \Delta\varphi);$$

wherein $\Delta x$ and $\Delta y$ represent coordinate transformation residual components of a point, r represents depth information of the point, $\varphi$ represents azimuth information of the point, $\Delta r$ represents a precision loss of the depth information of the point, and $\Delta\varphi$ represents a precision loss of the azimuth information of the point;

determining an encoding rule for the coordinate transformation residual based on the relationship between the azimuth information of the point cloud and the coordinate transformation residual; and encoding the coordinate transformation residual according to the encoding rule, to obtain data rate information.

2. The method for encoding a point cloud coordinate transformation residual according to claim 1, wherein the function expressions between the azimuth information of the point cloud and the coordinate transformation residual are approximated as follows:

$$\Delta x \approx -\Delta r \cdot \cos(\varphi), \text{ and}$$

$$\Delta y \approx -\Delta r \cdot \sin(\varphi);$$

wherein $\Delta x$ and $\Delta y$ represent coordinate transformation residual components of a point, $\varphi$ represents azimuth information of the point, and $\Delta r$ represents a precision loss of depth information of the point.

3. The method for encoding a point cloud coordinate transformation residual according to claim 1, wherein establishing the relationship between the azimuth information of the point cloud and the coordinate transformation residual further comprises:

obtaining a specific representation form of an angle value of an azimuth, a function value of an azimuth, or an azimuth symbol based on a function expression of the azimuth information of the point cloud and the coordinate transformation residual.

4. The method for encoding a point cloud coordinate transformation residual according to claim 1, wherein determining the encoding rule for the coordinate transformation residual based on the relationship between the azimuth information of the point cloud and the coordinate transformation residual comprises:

dividing an azimuth into several intervals based on the relationship between the azimuth information of the point cloud and the coordinate transformation residual; and setting a corresponding encoding rule for the coordinate transformation residual for each azimuth interval.

5. The method for encoding a point cloud coordinate transformation residual according to claim 4, wherein setting the corresponding encoding rule for the coordinate transformation residual for each azimuth interval comprises:

separately assigning a context model for a coordinate transformation residual of each azimuth interval, and performing corresponding initialization for entropy encoding of the coordinate transformation residual of each azimuth interval.

6. The method for encoding a point cloud coordinate transformation residual according to claim 5, wherein encoding the coordinate transformation residual according to the encoding rule comprises:

obtaining azimuth information of a current point, and determining an azimuth interval to which the current point belongs; and for different coordinate transformation residual components of the current point, selecting a corresponding context model based on the azimuth interval to perform entropy encoding.

7. An apparatus for encoding a point cloud coordinate transformation residual, comprising:

a computing device, configured to:

obtain original point cloud data;

transform coordinates of the original point cloud data to obtain a coordinate transformation residual;

establish a relationship between azimuth information of a point cloud and the coordinate transformation residual, wherein establishing the relationship between the azimuth information of the point cloud and the coordinate transformation residual comprises:

establishing function expressions between the azimuth information of the point cloud and the coordinate transformation residual as follows:

$$\Delta x = r \cdot \cos(\varphi) - (r + \Delta r) \cdot \cos(\varphi + \Delta\varphi), \text{ and}$$

$$\Delta y = r \cdot \sin(\varphi) - (r + \Delta r) \cdot \sin(\varphi + \Delta\varphi);$$

wherein $\Delta x$ and $\Delta y$ represent coordinate transformation residual components of a point, r represents depth information of the point, $\varphi$ represents azimuth information of the point, $\Delta r$ represents a precision loss of the depth information of the point, and $\Delta\varphi$ represents a precision loss of the azimuth information of the point;

determine an encoding rule for the coordinate transformation residual based on the relationship between the azimuth information of the point cloud and the coordinate transformation residual; and encode the coordinate transformation residual according to the encoding rule, to obtain data rate information.

8. A method for decoding a point cloud coordinate transformation residual, comprising:

obtaining data rate information;

determining a decoding rule for the coordinate transformation residual based on a relationship between azimuth information of a point cloud and the coordinate transformation residual, wherein the relationship between the azimuth information of the point cloud and the coordinate transformation residual comprises:

function expressions between the azimuth information of the point cloud and the coordinate transformation residual are as follows:

$$\Delta x = r \cdot \cos(\varphi) - (r + \Delta r) \cdot \cos(\varphi + \Delta\varphi), \text{ and}$$

$$\Delta y = r \cdot \sin(\varphi) - (r + \Delta r) \cdot \sin(\varphi + \Delta\varphi);$$

wherein $\Delta x$ and $\Delta y$ represent coordinate transformation residual components of a point, r represents depth information of the point, $\varphi$ represents azimuth information of the point, $\Delta r$ represents a precision loss of the depth information of the point, and Δφ represents a precision loss of the azimuth information of the point; and decoding the data rate information according to the decoding rule, to obtain a reconstructed point cloud coordinate transformation residual.

9. An apparatus for decoding a point cloud coordinate transformation residual, comprising:

a computing device, configured to:

obtain data rate information;

determine a decoding rule for the coordinate transformation residual based on a relationship between azimuth information of a point cloud and the coordinate transformation residual, wherein the relationship between the azimuth information of the point cloud and the coordinate transformation residual comprises:

function expressions between the azimuth information of the point cloud and the coordinate transformation residual are as follows:

$$\Delta x = r \cdot \cos(\varphi) - (r + \Delta r) \cdot \cos(\varphi + \Delta \varphi), \text{ and}$$
$$\Delta y = r \cdot \sin(\varphi) - (r + \Delta r) \cdot \sin(\varphi + \Delta \varphi);$$

wherein Δx and Δy represent coordinate transformation residual components of a point, r represents depth information of the point, φ represents azimuth information of the point, Δr represents a precision loss of the depth information of the point, and Δφ represents a precision loss of the azimuth information of the point; and decode the data rate information according to the decoding rule, to obtain a reconstructed point cloud coordinate transformation residual.

10. The apparatus for encoding a point cloud coordinate transformation residual according to claim 7, wherein the function expressions between the azimuth information of the point cloud and the coordinate transformation residual are approximated as follows:

$$\Delta x \approx -\Delta r \cdot \cos(\varphi), \text{ and}$$
$$\Delta y \approx -\Delta r \cdot \sin(\varphi);$$

wherein Δx and Δy represent coordinate transformation residual components of a point, φ represents azimuth information of the point, and Δr represents a precision loss of depth information of the point.

11. The apparatus for encoding a point cloud coordinate transformation residual according to claim 7, wherein establishing the relationship between the azimuth information of the point cloud and the coordinate transformation residual further comprises:

obtaining a specific representation form of an angle value of an azimuth, a function value of an azimuth, or an azimuth symbol based on a function expression of the azimuth information of the point cloud and the coordinate transformation residual.

12. The apparatus for encoding a point cloud coordinate transformation residual according to claim 7, wherein determining the encoding rule for the coordinate transformation residual based on the relationship between the azimuth information of the point cloud and the coordinate transformation residual comprises:

dividing an azimuth into several intervals based on the relationship between the azimuth information of the point cloud and the coordinate transformation residual; and setting a corresponding encoding rule for the coordinate transformation residual for each azimuth interval.

13. The apparatus for encoding a point cloud coordinate transformation residual according to claim 12, wherein setting the corresponding encoding rule for the coordinate transformation residual for each azimuth interval comprises:

separately assigning a context model for a coordinate transformation residual of each azimuth interval, and performing corresponding initialization for entropy encoding of the coordinate transformation residual of each azimuth interval.

14. The apparatus for encoding a point cloud coordinate transformation residual according to claim 13, wherein encoding the coordinate transformation residual according to the encoding rule comprises:

obtaining azimuth information of a current point, and determining an azimuth interval to which the current point belongs; and for different coordinate transformation residual components of the current point, selecting a corresponding context model based on the azimuth interval to perform entropy encoding.

15. The method for decoding a point cloud coordinate transformation residual according to claim 8, wherein the function expressions between the azimuth information of the point cloud and the coordinate transformation residual are approximated as follows:

$$\Delta x \approx -\Delta r \cdot \cos(\varphi), \text{ and}$$
$$\Delta y \approx -\Delta r \cdot \sin(\varphi);$$

wherein Δx and Δy represent coordinate transformation residual components of a point, φ represents azimuth information of the point, and Δr represents a precision loss of depth information of the point.

16. The apparatus for decoding a point cloud coordinate transformation residual according to claim 9, wherein the function expressions between the azimuth information of the point cloud and the coordinate transformation residual are approximated as follows:

$$\Delta x \approx -\Delta r \cdot \cos(\varphi), \text{ and}$$
$$\Delta y \approx -\Delta r \cdot \sin(\varphi);$$

wherein Δx and Δy represent coordinate transformation residual components of a point, φ represents azimuth information of the point, and Δr represents a precision loss of depth information of the point.

17. The method for decoding a point cloud coordinate transformation residual, according to claim 8, wherein determining the decoding rule for the coordinate transformation residual based on the relationship between the azimuth information of the point cloud and the coordinate transformation residual comprises:

dividing an azimuth into several intervals based on the relationship between the azimuth information of the point cloud and the coordinate transformation residual; and setting a corresponding decoding rule for the coordinate transformation residual for each azimuth interval.

18. The apparatus for decoding a point cloud coordinate transformation residual according to claim 9, wherein determining the decoding rule for the coordinate transformation residual based on the relationship between the azimuth information of the point cloud and the coordinate transformation residual comprises:

dividing an azimuth into several intervals based on the relationship between the azimuth information of the point cloud and the coordinate transformation residual; and setting a corresponding decoding rule for the coordinate transformation residual for each azimuth interval.

19. The method for encoding a point cloud coordinate transformation residual according to claim 1, wherein establishing the relationship between the azimuth information of the point cloud and the coordinate transformation residual further comprises:

obtaining a specific representation form of an angle value of an azimuth based on a function expression of the azimuth information of the point cloud and the coordinate transformation residual.

20. The method for encoding a point cloud coordinate transformation residual according to claim 1, wherein establishing the relationship between the azimuth information of the point cloud and the coordinate transformation residual further comprises:

obtaining a specific representation form of an azimuth symbol based on a function expression of the azimuth information of the point cloud and the coordinate transformation residual.

* * * * *